Feb. 26, 1946.                R. KELLY                2,395,670
POWER SUPPLY SYSTEM FOR CARRIER COMMUNICATION SYSTEMS
Filed July 12, 1943
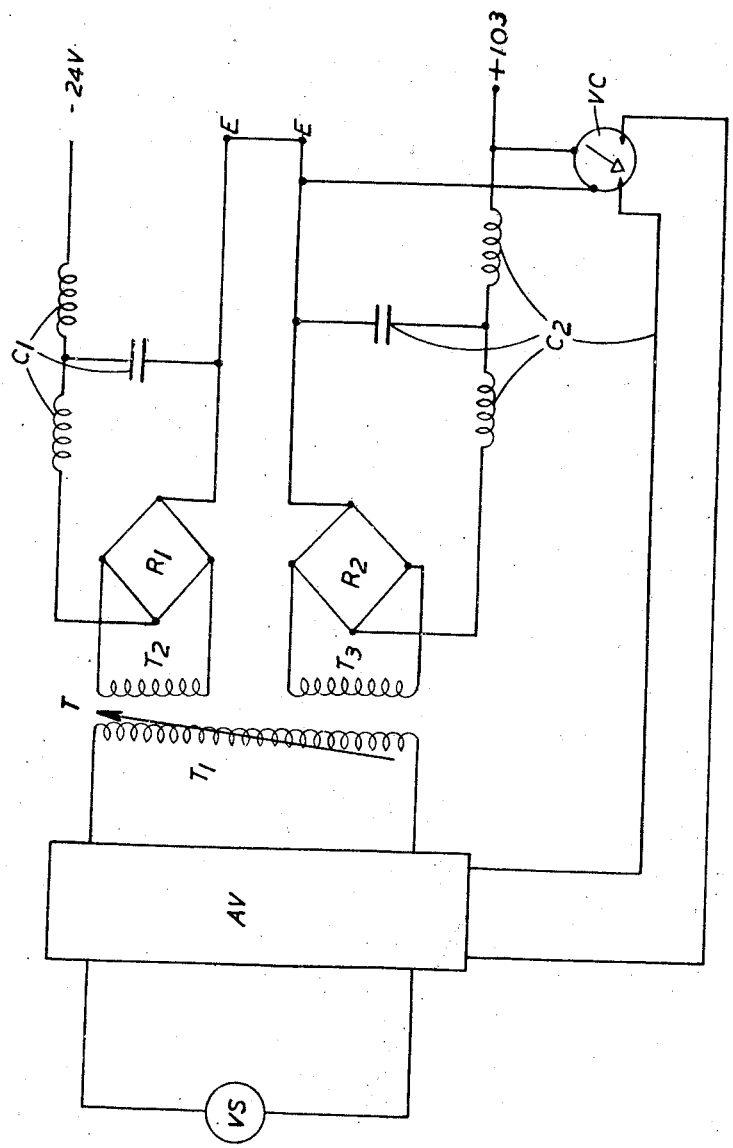
Inventor:
Richard Kelly
By Edward D. Pinney
Attorney Patented Feb. 26, 1946

2,395,670

UNITED STATES PATENT OFFICE 2,395,670

POWER SUPPLY SYSTEM FOR CARRIER COMMUNICATION SYSTEMS

Richard Kelly, London, England, assignor, by mesne assignments, to International Standard Electric Corporation, New York, N. Y., a corporation of Delaware Application July 12, 1943, Serial No. 494,344
In Great Britain August 14, 1942

1 Claim. (Cl. 171—97)

This invention relates to power supply arrangements for telecommunication systems. In repeaters for telephone systems, whether voice frequency, or carrier frequency systems, and in both repeaters and terminal equipment for carrier telephone and telegraph systems there are two different loads on the power supply, one a low tension load for the cathode heaters of the thermionic valves used in modulators, demodulators and amplifiers and the other a high tension load for the anode voltages for the said thermionic valves. It is convenient to derive the supply for both these loads from alternating current mains and rectifiers and since the mains supply voltage may vary and also each of the loads some form of voltage regulation is necessary to keep the voltage across the loads constant.

One object of this invention is to provide a power supply arrangement of this type in which improved voltage regulation is afforded.

Another object of this invention is to provide voltage regulation in the above-described arrangements, by utilizing the voltage change across one load only to alter the voltage across both loads, by acting upon a common source of energy supplying both loads.

According to the present invention I provide a power supply arrangement for a telecommunication system using thermionic valves comprising a transformer having a primary winding connected to an alternating power supply source and two secondary windings supplying through separate rectifiers a low tension and a high tension load for the said thermionic valves and means for varying the power supplied through said transformer to both secondary windings controlled automatically by a single control relay responsive to voltage changes across one or both of the loads.

The nature of the invention will be better understood from the following description taken in conjunction with the accompanying drawing, in which:

The figure shows diagrammatically one embodiment of a power supply arrangement according to the invention.

Referring to the drawing, an alternating power supply source VS, for example, an alternating current mains supply is connected to the primary $T_1$ of a transformer T having two secondary windings $T_2$ and $T_3$. Secondary winding $T_2$ supplies through a rectifier bridge $R_1$ and smoothing choke $C_1$ a voltage of 24 volts for the cathode heaters of the thermionic valves of a carrier telephone system. Secondary winding $T_3$ supplies through rectifier bridge $R_2$ and smoothing choke $C_2$ a voltage of 130 volts for the anode voltages of the above mentioned thermionic valves. Across the output side of the choke $C_2$ is connected a voltage regulator relay VC which may be of the kind described in British Patent No. 515,948. This relay determines in the manner described in the above mentioned patent a variation in the ratio of transformation of transformer T by controlling a motor which varies the effective turns of the primary $T_1$, as indicated by the arrow in the drawing, affixed to primary $T_1$. The rectangle AV represents such control arrangements as well as the switches connecting the source VS to the above mentioned contact members, which are shown in the drawing of the above mentioned specification. One of these switches is controlled by an overload coil connected across the output side of rectifier $R_2$ but this is not shown in the accompanying drawing.

With this arrangement, if the current drains on the low and high tension D. C. supplies remain constant, then both output voltages remain constant for variation of the mains supply voltage. If the high and low tension current drains vary in the same ratio, then the output voltages will remain constant for variations of load, as well as for variations of the mains supply voltages. In the case which has been illustrated, viz. a carrier telephone system, ballast lamps are usually fitted in the cathode circuits, and if the regulating relay VC is placed across the high tension supply load, as shown, the result is obtained that, even if the high tension and low tension loads may not vary in the same proportion, the resultant regulation is such that the life or characteristics of the thermionic valves are not impaired by any resulting slight variation in the low tension voltage supplied.

Cases may arise where it is advantageous to place the control relay across the low tension load or across both loads, i. e., between the —24 v. lead and the +130 v. lead in the drawing.

What is claimed is:

Power supply device for telecommunication systems and the like using thermionic valves and deriving energy from an alternating power supply source, including a transformer having a primary winding connected to said alternating power supply source and having two secondary windings, two rectifiers, each connected to one secondary winding, two load circuits, each connected to one rectifier, a control relay connected to one load circuit and responsive to voltage changes across said load, transformer control means for varying the effective turns of said primary winding, and means connecting said control relay and said transformer control means, whereby changes in said load circuit to which said control relay is connected, will cause changes in said transformer primary, thereby causing compensatory voltage changes in both said secondary windings.

RICHARD KELLY.